United States Patent
Photos et al.

(10) Patent No.: US 12,291,664 B1
(45) Date of Patent: May 6, 2025

(54) REDUCING SLURRY EMULSION AND FOAMING IN OXIDATION-REDUCTION SULFUR REMOVAL PROCESSES

(71) Applicant: STREAMLINE INNOVATIONS, INC., San Antonio, TX (US)

(72) Inventors: Peter J Photos, El Campo, TX (US); Franklin Hailey Brown, II, San Antonio, TX (US); David Sisk, San Antonio, TX (US)

(73) Assignee: STREAMLINE INNOVATIONS, INC., San Antonio, TX (US)

( * ) Notice: Subject to any disclaimer, the term of this patent is extended or adjusted under 35 U.S.C. 154(b) by 803 days.

(21) Appl. No.: 17/529,342

(22) Filed: Nov. 18, 2021

Related U.S. Application Data

(63) Continuation of application No. 16/425,254, filed on May 29, 2019, now abandoned.

(60) Provisional application No. 62/678,647, filed on May 31, 2018.

(51) Int. Cl.
| | | |
|---|---|---|
| *C09K 23/00* | (2022.01) | |
| *B01D 53/48* | (2006.01) | |
| *B01D 53/78* | (2006.01) | |
| *C02F 1/54* | (2023.01) | |
| *C02F 101/10* | (2006.01) | |
| *C09K 23/42* | (2022.01) | |

(52) U.S. Cl.
CPC ............ *C09K 23/018* (2022.01); *B01D 53/48* (2013.01); *B01D 53/78* (2013.01); *C02F 1/547* (2013.01); *C09K 23/42* (2022.01); *C02F 2101/101* (2013.01)

(58) Field of Classification Search
None
See application file for complete search history.

(56) References Cited

U.S. PATENT DOCUMENTS

| | | | | |
|---|---|---|---|---|
| 4,374,104 A | * | 2/1983 | Primack | C01B 17/05 423/576.2 |
| 5,071,633 A | * | 12/1991 | de Haan | B01D 53/1425 423/576.2 |
| 7,144,555 B1 | * | 12/2006 | Squires | B01D 53/78 422/168 |
| 2004/0166043 A1 | * | 8/2004 | Vandine | B01D 53/72 502/401 |
| 2019/0322948 A1 | * | 10/2019 | Begeal | B01D 53/1468 |

* cited by examiner

*Primary Examiner* — John J Figueroa
(74) *Attorney, Agent, or Firm* — Jayne Saydah

(57) ABSTRACT

A surfactant composition in aqueous phase includes 0.5% to 15% by weight of an alkoxylated block copolymer and 0.5% to 15% by weight of an alcohol ethoxylate. The non-ionic alkyl ethoxylate is a fast wetting agent. The block copolymer, which is characterized by a longer wetting time than the non-ionic alkyl ethoxylate, disrupts the emulsion and allows the now-coated sulfur particles to escape the existing emulsion. The composition may also include an alkyl alcohol and/or glycol ether. The alkyl alcohol augments the emulsion-breaking capabilities of the diblock copolymer by providing additional surface tension reduction to the system, as well as emulsion inhibition at the aqueous-gaseous interface. The glycol ether acts as a mutual solvent, which also augments the emulsion breaking capabilities of the diblock copolymer by providing additional surface tension reduction to the system, as well as emulsion inhibition at the aqueous-gaseous interface.

20 Claims, 3 Drawing Sheets

REDUCING SLURRY EMULSION AND FOAMING IN OXIDATION-REDUCTION SULFUR REMOVAL PROCESSES

RELATED APPLICATIONS

This is a Continuation Application of U.S. application Ser. No. 16/425,254 filed May 29, 2019, which claims priority to U.S. Provisional Application, filed 62/678,647 filed May 31, 2018. The disclosures of the prior applications are hereby incorporated by reference herein in their entirety.

TECHNICAL FIELD

Aspects of the present disclosure are generally related to treatment of sour gas and wastewater streams, and more particularly to surfactants for reduction of slurry emulsion and foaming in oxidation-reduction systems for removing sulfur-based contaminants from sour gas and wastewater streams.

BACKGROUND

Raw natural gas from oil and gas wells typically contains contaminants such as hydrogen sulfide ($H_2S$). Natural gas is usually considered sour if there are more than 5.7 milligrams of hydrogen sulfide per cubic meter of natural gas, which is equivalent to approximately 4 ppm by volume under standard temperature and pressure. Because hydrogen sulfide is highly toxic and sour gas requires relatively costly infrastructure to transport it is desirable to remove the hydrogen sulfide from the sour gas stream at or near the well head. However, commercially viable small-scale field processing systems for desulfurization of raw natural gas have proved to be difficult to implement.

SUMMARY

A surfactant composition for processing sour gas and wastewater streams using oxidation-reduction desulfurization comprises non-ionic alkyl ethoxylate and a block copolymer. The non-ionic alkyl ethoxylate acts as a fast wetting agent. The block copolymer is characterized by a longer wetting time than the non-ionic alkyl ethoxylate. The block copolymer disrupts the emulsion and allows the now-coated sulfur particles to escape the existing emulsion.

In accordance with some implementations an aqueous surfactant composition comprises: 0.5% to 15% by weight of an alkoxylated block copolymer; and 0.5% to 15% by weight of an alcohol ethoxylate. Some implementations comprise greater than 0% and up to 50% by weight of a glycol ether. Some implementations comprise greater than 0% and up to 50% by weight of an alkyl alcohol. In some implementations the alkoxylated block copolymer comprises a structure: R1-[R2]n-R3, wherein R1 is a long-chain alkyl group, R2 a block copolymer, and R3 an end cap, and wherein n is a number of different blocks in the block copolymer. In some implementations the alcohol ethoxylate comprises a long-chain alkyl group, wherein the alkyl group comprises at least seven carbon atoms. In some implementations at least one block of the alkoxylated block copolymer comprises polyethylene glycol, with a number of blocks between three and ten units. Some implementations, wherein at least one block of the alkoxylated block copolymer is a more hydrophobic unit than the polyethylene gylcol, comprise at least one of: polypropylene glycol, polylactone, polycaprolactone, and/or polybutadiene, with the number of blocks between twenty and forty units. In some implementations the end cap comprises at least on of: a hydroxyl group and a short-chained alcohol of less than five carbon atoms. In some implementations the alkoxylated block copolymer comprises a Hydrophobic-Lipophilic Balance between 0 and 10. In some implementations the alcohol ethoxylate comprises a structure: R4-O—(CH2)x-OH, where R4 is a long chain alkyl group, and x is a number between 1 and 5. In some implementations the alkyl group comprises at least seven carbon atoms. In some implementations the alcohol ethoxylate comprises a Hydrophobic-Lipophilic Balance between 5 and 15. In some implementations the Draves Wetting Time of the alcohol ethoxylate is less than half than that of the alkoxylated block copolymer. In some implementations the concentration of the block copolymer is between 2- and 10-times by weight the concentration of the alcohol ethoxylate. In some implementations the glycol ether comprises a structure: R5-(O—CH2)x-OH, where R5 is a short-chained alkyl group and x is a number between 2 and 4. In some implementations the short-chained alkyl group comprises less than six carbon atoms. In some implementations the alkyl alcohol comprises an alkyl chain between 2 and 8 carbon units selected from the group consisting of: ethanol, propanol, isopropanol, n-butanol, isobutanol, n-pentanol, isopentanol, hexanol, heptanol and/or octanol isomers. In some implementations the glycol ether comprises a structure R6-R7 wherein R6 is an alkyl or aryl group, and R7 is a short-chained glycol group. In some implementations the group comprises one of: methyl, ethyl, propyl, isopropyl, butyl, n-butyl, tert-butyl, phenyl, and benzyl groups. In some implementations the group comprises one of: ethylene glycol (—O—CH2-CH2-OH), propylene glycol (—O—CH2-CH2-CH2-OH), and diethylene gylcol (—OCH2-CH2-O—CH2-CH2-OH).

All examples, aspects, and features mentioned in this document can be combined in any technically possible way. Moreover, alternative chemical forms including, but not limited to, salts, polymorphs, and solvates are within the scope of the present disclosure.

DETAILED DESCRIPTION

Small scale field processing systems for oxidation-reduction desulfurization of raw natural gas have eluded full commercialization due to the complexities of the multiphase nature of the process. The presence of multiple phases (oil, water, solid, and gaseous) promotes the creation of foams and emulsions that can cause operational difficulties such as pump cavitation, clogging, and sensor degradation. The multiphase composition of the raw natural gas stream is further complicated by a wide range in pH and temperature often seen in such operations, which has previously restricted the use of any single surfactant and/or demulsifier to abrogate the challenges seen in such complex systems. Anionic surfactants are non-ideal because of their extreme foaming tendencies. Defoamers have not provided a solution to the problem because they interfere with the oxidation-reduction chemistry and restrict the agricultural applications of the produced sulfur.

Figure 1:
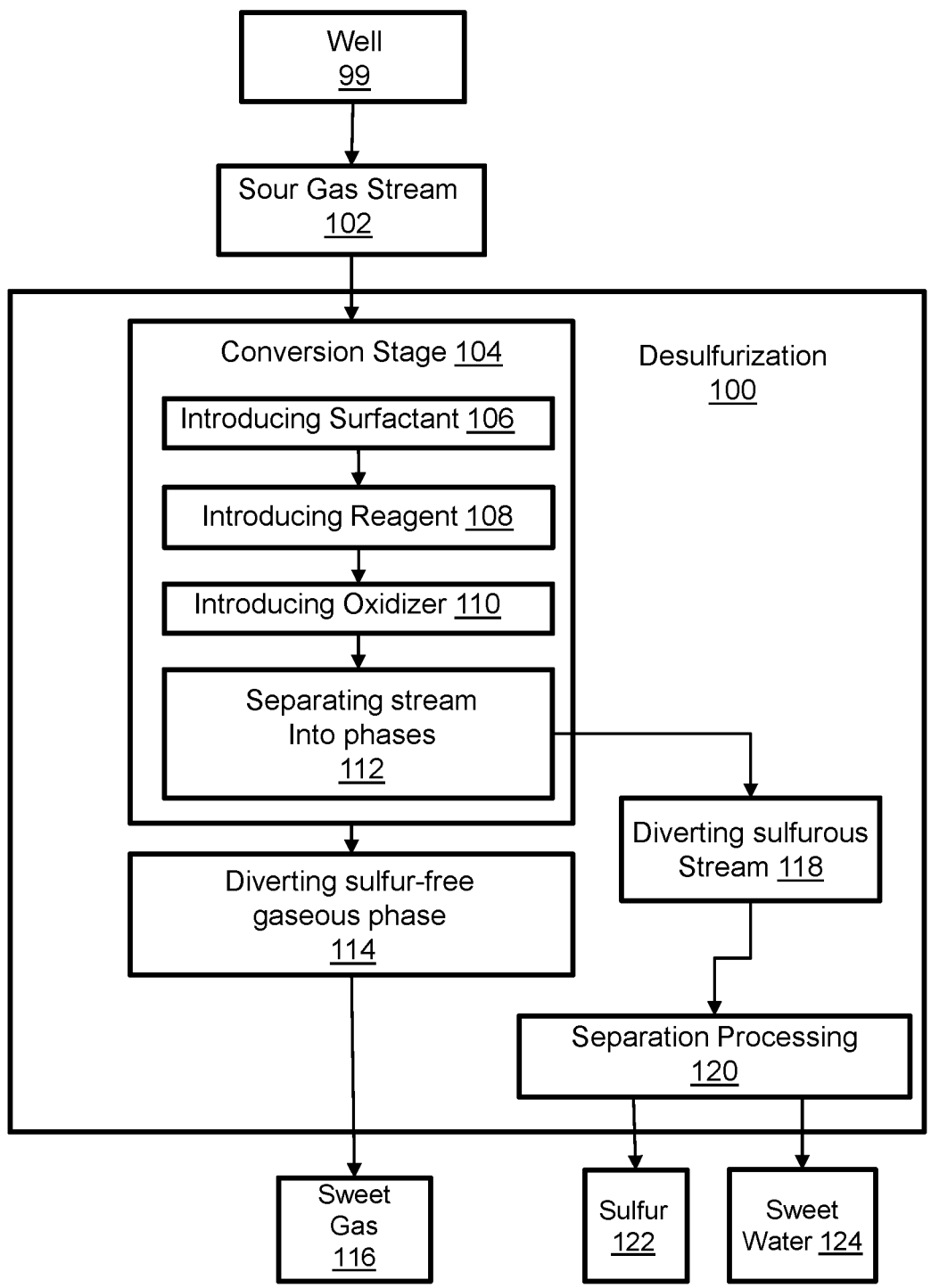
FIG. 1 illustrates an oxidation-reduction desulfurization process using a surfactant that simultaneously improves reaction kinetics and mitigates operational difficulties associated with the oxidation-reduction process.

FIG. 1 illustrates an oxidation-reduction desulfurization process 100 for removal or recovery of sulfur-based contaminants from a sour gas stream 102 by using a surfactant that simultaneously improves reaction kinetics and mitigates operational difficulties associated with the desulfurization process. Although the desulfurization process is described and illustrated in the context of removing hydrogen sulfide from a sour gas stream 102 from a well 99, wastewater that contains sulfur-based contaminants from a wide variety of sources other than oil and gas wells could be treated. For example, and without limitation, the process might be used to treat leachate from landfills and discharge wastewater from meat production facilities. Consequently, the invention should not be viewed as limited to treatment of sour gas streams from oil and gas wells. The order in which steps are performed may be rearranged, and some steps may be implemented partially or wholly concurrently.

The desulfurization process 100 includes a conversion stage 104 in which sulfur species that are present in the sour gas stream 102 are converted into elemental sulfur, sulfur species, or both. The conversion stage 104 includes introducing a surfactant in step 106, introducing a reagent in step 108, and introducing oxidizer in step 110. The reagent may include one or more of ferric salts, ferrous salts, ferric chelants, ferrous chelants, and Fe-MGDA (ferric/ferrous methylglycinediacetate), e.g. Alanine, n,n-bid, (carboxymethyl) iron complex (CAS 547763-83-7). The oxidizer may include one or more of chlorine, hypochlorous acid, hypochlorite, chlorine dioxide, chlorite, perchlorate, inorganic peroxides, permanganates, sodium, oxygen, and ozone. In the conversion stage 104 the hydrogen sulfide in the sour gas stream is oxidized into elemental sulfur, sulfur species, or both by exposure to the combination of reagent and oxidizer. The surfactant inhibits emulsion formation, promotes settling of sulfur, reduces or prevents foaming, and facilitates removal of solids. The surfactant may simultaneously improve reaction kinetics and mitigate operational difficulties associated with the oxidation-reduction desulfurization process. Step 112 is separating the converted stream into phases. The gaseous phase is diverted in step 114, resulting in recovery of sweet gas 116 from the sour gas stream 102. The remaining aqueous or multi-phase stream is diverted in step 118 and subjected to further separation processing in step 120. The result of step 120 may include, but is not limited to, sulfur 122 (elemental sulfur, sulfur species, or both) and sweet water 124.

The surfactant may be a blend of two chemical compositions that act in concert. The first chemical composition is a non-ionic alkyl ethoxylate. The non-ionic alkyl ethoxylate acts as a fast wetting agent. The second chemical composition is a block copolymer, e.g. a diblock copolymer. The block copolymer is characterized by a longer wetting time than the non-ionic alkyl ethoxylate. In the first minute within addition the non-ionic alkyl ethoxylate creates a thin film around the sulfur particles. The block copolymer disrupts the emulsion and allows the now-coated sulfur particles to escape the existing emulsion.

An aspect that promotes efficacy of the surfactant is the difference in reaction rates between the non-ionic alkyl ethoxylate and the block copolymer. If both compositions had the same reaction rates and operated at the same time scale, the wetting agent would be competing with the diblock copolymer on the sulfur particle surface, thereby requiring a greater amount of the wetting agent. Additionally, the diblock copolymer on the sulfur particle surface would slow down settling due to steric hindrance effects, thereby making the formulation less efficient.

Another aspect that promotes efficacy of the surfactant is the ratio of concentrations of the non-ionic alkyl ethoxylate and the block copolymer. Surplus alkyl ethoxylate will inhibit the emulsion-breaking capabilities of the block copolymer, and surplus block copolymer will sterically hinder the alkyl ethoxylate from reaching the sulfur particle surface. The ratio of block copolymer to alkyl ethoxylate in some implementations is between 2- and 10-times in concentration by weight.

The surfactant may include additional optional reagents. A first optional reagent is an alkyl alcohol that has a carbon length chain between 3 and 8, possibly including, but not limited to: propanol, isopropanol, n-pentanol, n-butanol, isobutanol, sec-butanol, tert-butanol, and/or isomers of pentanol, hexanol, heptanol, or octanol. The first optional reagent augments the emulsion-breaking capabilities of the diblock copolymer by providing additional surface tension reduction to the system, as well as emulsion inhibition at the aqueous-gaseous interface. A second optional reagent is glycol ether, possibly including, but not limited to: ethylene glycol monobutyl ether, ethylene glycol benzyl ether, and diethylene glycol monobutyl ether. The glycol ether acts as a mutual solvent, which also augments the emulsion breaking capabilities of the diblock copolymer by providing additional surface tension reduction to the system, as well as emulsion inhibition at the aqueous-gaseous interface.

In some implementations the surfactant includes or consists of 1% to 4% by weight non-ionic alkyl ethoxylate, for example, an alkyl-ethoxylate with a Hydrophilic-Lipophilic Balance (HLB) of 2-4; 8% to 10% by weight diblock copolymer, for example a PEG-PEO diblock copolymer with HLB of 8-10; 30% to 50% by weight alcohol, and the balance glycol ether. In some implementations the surfactant includes or consists of 1% to 4% by weight non-ionic alkyl alkoxylate, for example, an ethoxy alkoxylate with a Hydrophilic-Lipophilic Balance (HLB) of 2-4; 8% to 10% by weight diblock copolymer; and the balance water. Some implementations comprise greater than 0% and up to 50% by weight of a glycol ether. Some implementations comprise greater than 0% and up to 50% by weight of an alkyl alcohol. In some implementations the alkoxylated block copolymer comprises a structure: R1-[R2]n-R3, wherein R1 is a long-chain alkyl group, R2 a block copolymer, and R3 an end cap, and wherein n is a number of different blocks in the block copolymer. In some implementations the alcohol ethoxylate comprises a long-chain alkyl group, wherein the alkyl group comprises at least seven carbon atoms. In some implementations at least one block of the alkoxylated block copolymer comprises polyethylene glycol, with a number of blocks between three and ten units. Some implementations, wherein at least one block of the alkoxylated block copolymer is a more hydrophobic unit than the polyethylene gylcol, comprise at least one of: polypropylene glycol, polylactone, polycaprolactone, and/or polybutadiene, with the number of blocks between twenty and forty units. In some implementations the end cap comprises at least on of: a hydroxyl group and a short-chained alcohol of less than five carbon atoms. In some implementations the alkoxylated block copolymer comprises a Hydrophobic-Lipophilic Balance between 0 and 10. In some implementations the alcohol ethoxylate comprises a structure: $R4-O-(CH_2)_x-OH$, where R4 is a long chain alkyl group, and x is a number between 1 and 5. In some implementations the alkyl group comprises at least seven carbon atoms. In some implementations the alcohol ethoxylate comprises a Hydrophobic-Lipophilic Balance between 5 and 15. In some implementations the Draves Wetting Time of the alcohol ethoxylate is less than half than that of the alkoxylated block copolymer. In some implementations the concentration of the block copolymer is between 2- and 10-times by weight the concentration of the alcohol ethoxylate. In some implementations the glycol ether comprises a structure: R5-(O—CH2)x-OH, where R5 is a short-chained alkyl group and x is a number between 2 and 4. In some implementations the short-chained alkyl group comprises less than six carbon atoms. In some implementations the alkyl alcohol comprises an alkyl chain between 2 and 8 carbon units selected from the group consisting of: ethanol, propanol, isopropanol, n-butanol, isobutanol, n-pentanol, isopentanol, hexanol, heptanol and/or octanol isomers. In some implementations the glycol ether comprises a structure R6-R7 wherein R6 is an alkyl or aryl group, and R7 is a short-chained glycol group. In some implementations the group comprises one of: methyl, ethyl, propyl, isopropyl, butyl, n-butyl, tert-butyl, phenyl, and benzyl groups. In some implementations the group comprises one of: ethylene glycol (—O—CH2-CH2-OH), propylene glycol (—O—CH2-CH2-CH2-OH), and diethylene gylcol (—OCH2-CH2-O—CH2-CH2-OH).

Figure 2:
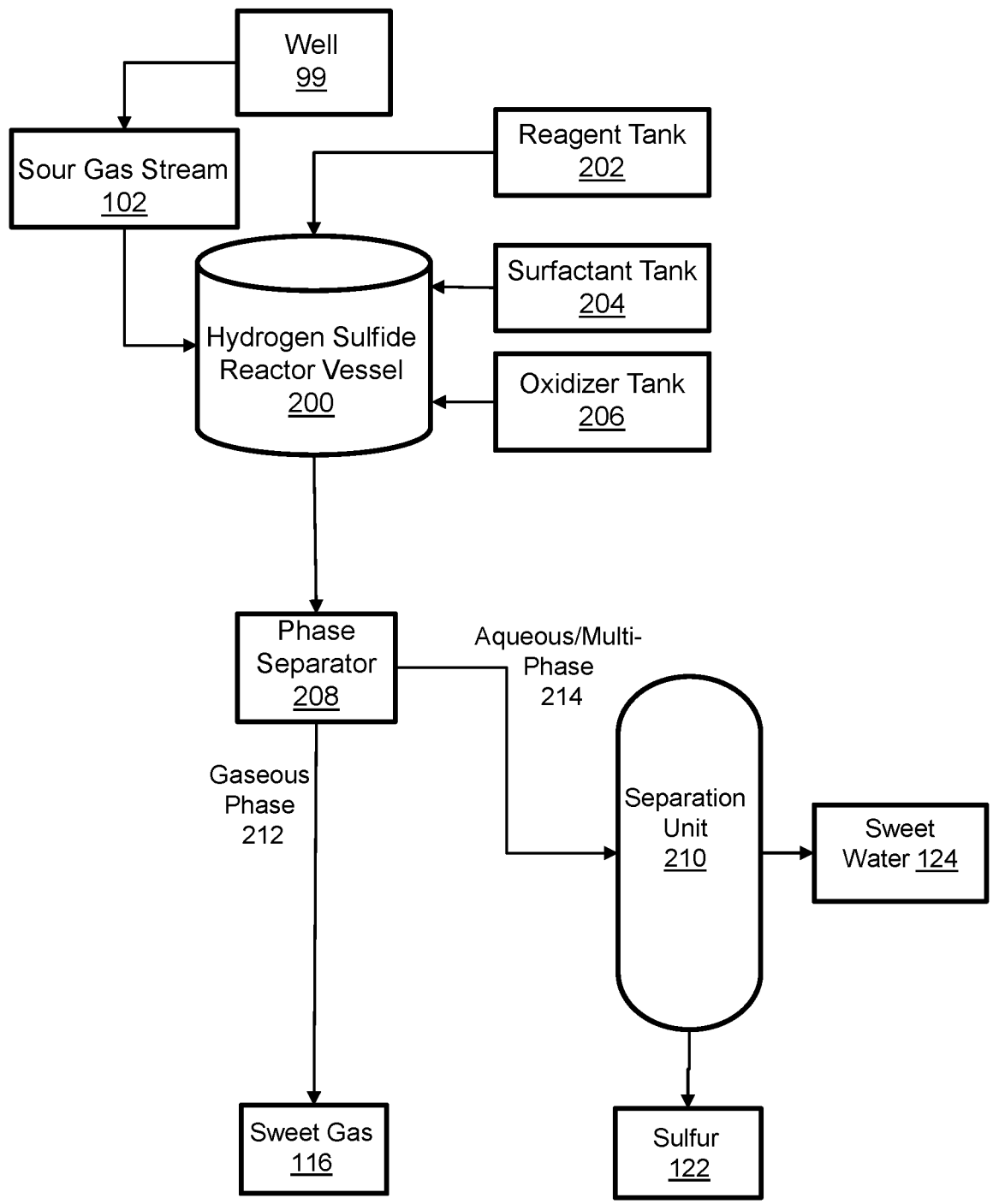
FIG. 2 illustrates an apparatus for implementing the oxidation-reduction desulfurization process of FIG. 1.

FIG. 2 illustrates an apparatus for implementing the oxidation-reduction desulfurization process of FIG. 1. The apparatus includes a hydrogen sulfide reactor vessel 200, a reagent tank 202, a surfactant tank 204, an oxidizer tank 206, a phase separator 208, and a separation unit 210. The sour gas stream 102 from well 99 is inputted to the hydrogen sulfide reactor vessel 200. The reactor vessel is a pressure vessel matched to the pressure of the sour gas stream. Reagent, surfactant, and oxidizer are introduced to the reactor vessel 200 from their respective tanks 202, 204, 206. The hydrogen sulfide in the sour gas stream is oxidized into elemental sulfur, sulfur species, or both by exposure to the reagent and oxidizer. The surfactant inhibits emulsion formation, promotes settling of sulfur, reduces or prevents foaming, and facilitates removal of solids. The phase separator 208 is used to separate the gaseous phase 212 from the remaining aqueous/multi-phase 214. The gaseous phase 212 is sweet gas 116. The aqueous/multi-phase is provided to the separation unit to separate sulfur 122 (elemental and/or sulfur species) and sweet water 124.

Figure 3:
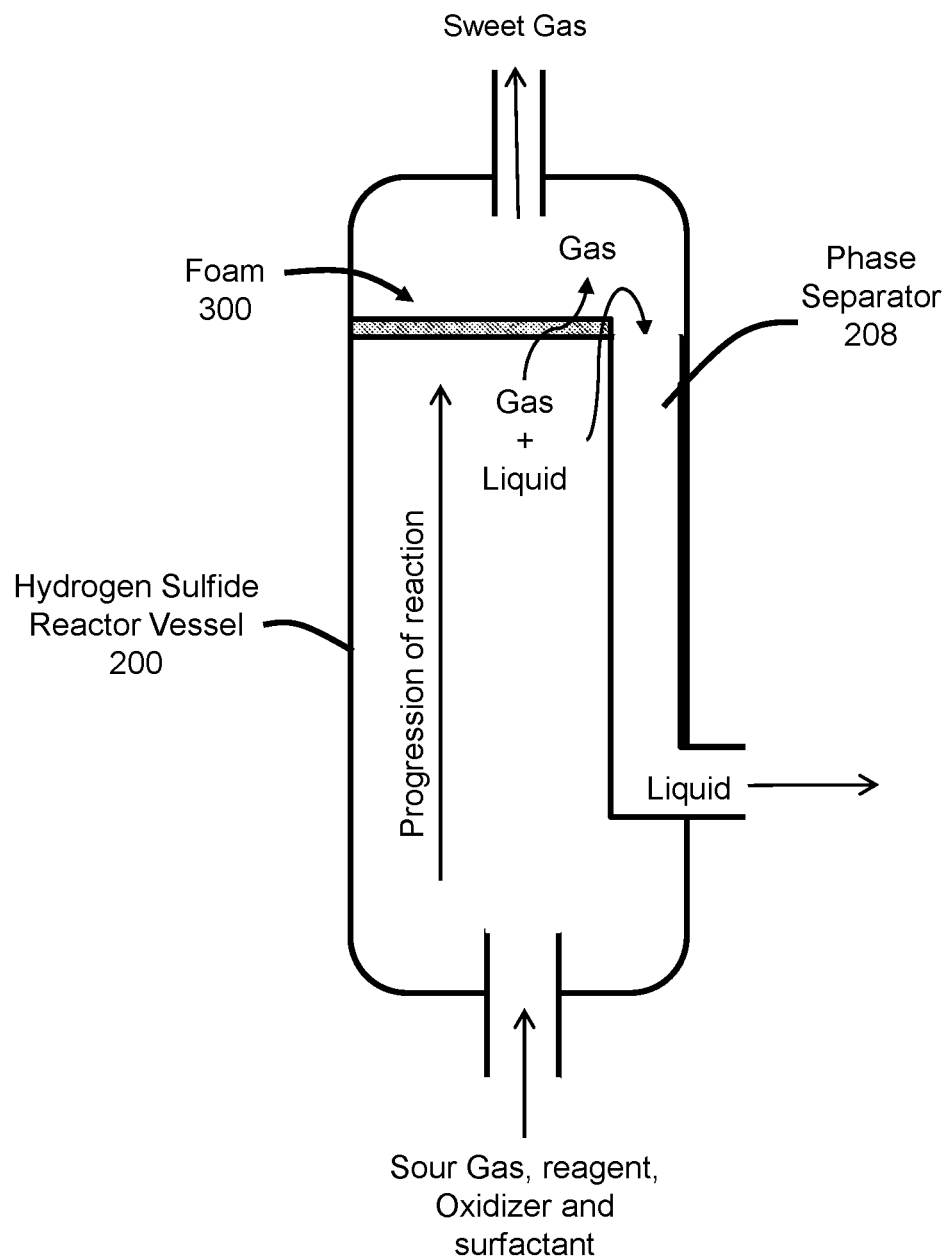
FIG. 3 illustrates how the surfactant facilitates operation of the phase separator.

FIG. 3 illustrates how the surfactant facilitates operation of the phase separator 208. In the illustrated example the phase separator 208 includes a vertically oriented conduit in the reactor vessel 200. As sour gas, reagent, oxidizer, and surfactant are introduced at the bottom of the reactor vessel the reaction progresses upward in the column of gas and liquid. A layer of foam 300 forms at the top surface of the liquid and gas column. separated sweet gas is removed at the top of the reactor vessel. The remaining liquid flows into the phase separator. Excessive amounts of foam would potentially cause gas to flow into the phase separator with the liquid, resulting in recovery of less sweet gas. Further, excessive amounts of foam could cause sour liquid to exit the reactor vessel with the sweet gas.

Several features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method for converting sulfur species that are present in a sour gas stream into at least one of solid sulfur or solid sulfur species, comprising the steps of:
   introducing a surfactant to the sour gas stream, comprising introducing an aqueous surfactant composition comprising 0.5% to 15% by weight of an alkoxylated block copolymer and 0.5% to 15% by weight of an alcohol ethoxylate;
   introducing a reagent to the sour gas stream; and
   introducing an oxidizer to the sour gas stream.

2. The method of claim 1 wherein introducing the surfactant comprises introducing an aqueous surfactant composition comprising 0.5% to 15% by weight of an alkoxylated block copolymer and 0.5% to 15% by weight of an alcohol ethoxylate with greater than 0% and up to 50% by weight of a glycol ether.

3. The method of claim 1 wherein introducing the surfactant comprises introducing an aqueous surfactant composition comprising 0.5% to 15% by weight of an alkoxylated block copolymer and 0.5% to 15% by weight of an alcohol ethoxylate with greater than 0% and up to 50% by weight of an alkyl alcohol.

4. The method of claim 1 wherein introducing the surfactant comprises introducing an aqueous surfactant composition comprising 0.5% to 15% by weight of an alkoxylated block copolymer and 0.5% to 15% by weight of an alcohol ethoxylate, wherein the alkoxylated block copolymer comprises a structure: R1-[R2]n-R3, wherein R1 is an alkyl group arranged in a chain, R2 is a block copolymer, n is a number, and R3 is an end cap.

5. The method of claim 4 wherein introducing the surfactant comprises introducing an aqueous surfactant composition comprising 0.5% to 15% by weight of an alkoxylated block copolymer and 0.5% to 15% by weight of an alcohol ethoxylate comprising an alkyl group arranged in a chain comprising at least seven carbon atoms.

6. The method of claim 4 wherein introducing the surfactant comprises introducing an aqueous surfactant composition comprising 0.5% to 15% by weight of an alkoxylated block copolymer and 0.5% to 15% by weight of an alcohol ethoxylate, wherein at least one block of the alkoxylated block copolymer comprises polyethylene glycol, with a number of blocks between three and ten units.

7. The method of claim 6 wherein introducing the surfactant comprises introducing an aqueous surfactant composition comprising 0.5% to 15% by weight of an alkoxylated block copolymer and 0.5% to 15% by weight of an alcohol ethoxylate, wherein at least one block of the alkoxylated block copolymer is a more hydrophobic unit than the polyethylene gylcol, and comprising at least one of: polypropylene glycol, polylactone, polycaprolactone, and/or polybutadiene.

8. The method of claim 4 wherein introducing the surfactant comprises introducing an aqueous surfactant composition comprising 0.5% to 15% by weight of an alkoxylated block copolymer and 0.5% to 15% by weight of an alcohol ethoxylate, wherein the end cap comprises at least one of: a hydroxyl group and a short-chained alcohol of less than five carbon atoms.

9. The method of claim 1 wherein introducing the surfactant comprises introducing an aqueous surfactant composition comprising 0.5% to 15% by weight of an alkoxylated block copolymer and 0.5% to 15% by weight of an alcohol ethoxylate, wherein the alkoxylated block copolymer comprises a Hydrophobic-Lipophilic Balance between 0 and 10.

10. The method of claim 1 wherein introducing the surfactant comprises introducing an aqueous surfactant composition comprising 0.5% to 15% by weight of an alkoxylated block copolymer and 0.5% to 15% by weight of an alcohol ethoxylate, wherein the alcohol ethoxylate comprises a structure: R4-O—(CH2)x-OH, where R4 is an alkyl group arranged in a chain.

11. The method of claim 10 wherein introducing the surfactant comprises introducing an aqueous surfactant composition comprising 0.5% to 15% by weight of an alkoxylated block copolymer and 0.5% to 15% by weight of an alcohol ethoxylate, wherein the alkyl group comprises at least seven carbon atoms.

12. The method of claim 1 wherein introducing the surfactant comprises introducing an aqueous surfactant composition comprising 0.5% to 15% by weight of an alkoxylated block copolymer and 0.5% to 15% by weight of an alcohol ethoxylate, wherein the alcohol ethoxylate comprises a Hydrophobic-Lipophilic Balance between 5 and 15.

13. The method of claim 1 wherein introducing the surfactant comprises introducing an aqueous surfactant composition comprising 0.5% to 15% by weight of an alkoxylated block copolymer and 0.5% to 15% by weight of an alcohol ethoxylate, wherein wetting time of the alcohol ethoxylate is less than half than that of the alkoxylated block copolymer.

14. The method of claim 1 wherein introducing the surfactant comprises introducing an aqueous surfactant composition comprising 0.5% to 15% by weight of an alkoxylated block copolymer and 0.5% to 15% by weight of an alcohol ethoxylate, wherein concentration of the block copolymer is between 2- and 10-times concentration by weight of the alcohol ethoxylate.

15. The method of claim 2 wherein introducing the surfactant comprises introducing an aqueous surfactant composition comprising 0.5% to 15% by weight of an alkoxylated block copolymer and 0.5% to 15% by weight of an alcohol ethoxylate, wherein the glycol ether comprises a structure: R5-(O—CH2)x-OH, where R5 is an alkyl group arranged in a chain and x is a number between 2 and 4.

16. The method of claim 15 wherein introducing the surfactant comprises introducing an aqueous surfactant composition comprising 0.5% to 15% by weight of an alkoxylated block copolymer and 0.5% to 15% by weight of an alcohol ethoxylate, wherein the short-chained alkyl group comprises less than six carbon atoms.

17. The method of claim 3 wherein introducing the surfactant comprises introducing an aqueous surfactant composition comprising 0.5% to 15% by weight of an alkoxylated block copolymer and 0.5% to 15% by weight of an alcohol ethoxylate, wherein the alkyl alcohol comprises between 2 and 8 carbon units selected from the group consisting of: ethanol, propanol, isopropanol, n-butanol, isobutanol, n-pentanol, isopentanol, hexanol, heptanol and/or octanol isomers.

18. The method of claim 2 wherein introducing the surfactant comprises introducing an aqueous surfactant composition comprising 0.5% to 15% by weight of an alkoxylated block copolymer and 0.5% to 15% by weight of an alcohol ethoxylate, wherein the glycol ether comprises a structure R6-R7 wherein R6 is an alkyl or aryl group, and R7 is a short-chained glycol group.

19. The method of claim 15 wherein introducing the surfactant comprises introducing an aqueous surfactant composition comprising 0.5% to 15% by weight of an alkoxylated block copolymer and 0.5% to 15% by weight of an alcohol ethoxylate, wherein the group comprises one of: methyl, ethyl, propyl, isopropyl, butyl, n-butyl, tert-butyl, phenyl, and benzyl groups.

20. The method of claim 2 wherein introducing the surfactant comprises introducing an aqueous surfactant composition comprising 0.5% to 15% by weight of an alkoxylated block copolymer and 0.5% to 15% by weight of an alcohol ethoxylate, wherein the glycol ether comprises one of: ethylene glycol (—O—CH2-CH2-OH), propylene glycol (—O—CH2-CH2-CH2-OH), and diethylene gylcol (—OCH2-CH2-O—CH2-CH2-OH).

* * * * *